US009894140B2

(12) United States Patent
Campbell et al.

(10) Patent No.: US 9,894,140 B2
(45) Date of Patent: *Feb. 13, 2018

(54) MANAGING FILE DOWNLOADS (71) Applicant: International Business Machines Corporation, Armonk, NY (US)

(72) Inventors: Daniel A. Campbell, Longmont, CO (US); Robert F. Pryor, Lynn Haven, FL (US); John B. Simmons, Westminster, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/944,283

(22) Filed: Nov. 18, 2015

(65) Prior Publication Data

US 2016/0072874 A1 Mar. 10, 2016

Related U.S. Application Data (63) Continuation of application No. 11/612,575, filed on Dec. 19, 2006, now Pat. No. 9,229,933.

(51) Int. Cl.
*G06F 15/16* (2006.01)
*H04L 29/08* (2006.01)
(Continued)

(52) U.S. Cl.
CPC ........ *H04L 67/06* (2013.01); *G06F 17/30011* (2013.01); *H04L 67/02* (2013.01);
(Continued)

(58) Field of Classification Search
CPC ...................................................... H04L 67/06
(Continued)

(56) References Cited

U.S. PATENT DOCUMENTS 5,946,465 A 8/1999 Chmielewski et al.
6,460,087 B1 * 10/2002 Saito ...................... H04L 29/06
370/465

(Continued)

OTHER PUBLICATIONS

Notice of Allowance (dated Aug. 26, 2015) for U.S. Appl. No. 11/612,575, filed Dec. 19, 2006.
(Continued)

*Primary Examiner* — Liangche A Wang
*Assistant Examiner* — Sherman Lin
(74) *Attorney, Agent, or Firm* — Schmeiser, Olsen & Watts, LLP; William H. Hartwell (57) ABSTRACT

A method and system for managing download of a file. In response to a request from a client computer to establish a session to download the file beginning at a specified location after a start of the file, an estimated length of a portion of the file beginning at the specified location is estimated, a time window for enabling the client computer to avoid a redundant download of a portion of the file by terminating the session within the time window is computed, and the download of the file is suspended for the time window. If the session is not terminated within the time window, then download of the file is automatically resumed following the length in further response to the request. If the session is terminated within the time window, then download of the file is not automatically resumed following the length in further response to the request.

20 Claims, 4 Drawing Sheets (51) Int. Cl.
*G06F 17/30* (2006.01)
*H04W 4/02* (2018.01)
*H04L 29/06* (2006.01)

(52) U.S. Cl.
CPC .............. *H04L 67/18* (2013.01); *H04L 69/28* (2013.01); *H04W 4/02* (2013.01)

(58) Field of Classification Search
USPC .................................................. 709/232, 219
See application file for complete search history.

(56) References Cited

U.S. PATENT DOCUMENTS

| | | | |
|---|---|---|---|
| 6,772,202 | B2 | 8/2004 | Wright |
| 6,912,586 | B1* | 6/2005 | Achtermann ........... H04L 67/06 370/226 |
| 7,047,314 | B2 | 5/2006 | Sato et al. |
| 2002/0103915 | A1* | 8/2002 | Shuster .................. H04L 29/06 709/229 |
| 2003/0031178 | A1 | 2/2003 | Haeri et al. |
| 2003/0050074 | A1 | 3/2003 | Kogiantis et al. |
| 2003/0058804 | A1 | 3/2003 | Saleh et al. |
| 2003/0084165 | A1 | 5/2003 | Kjelberg et al. |
| 2004/0088427 | A1 | 5/2004 | Purdy |
| 2006/0069775 | A1* | 3/2006 | Artobello ............. H04L 67/325 709/225 |
| 2006/0130107 | A1 | 6/2006 | Gonder et al. |
| 2006/0137009 | A1 | 6/2006 | Chesla |
| 2008/0147876 | A1 | 6/2008 | Campbell et al. |

OTHER PUBLICATIONS

Amendment (dated Apr. 14, 2015) for U.S. Appl. No. 11/612,575, filed Dec. 19, 2006.
Office action (dated Jan. 15, 2015) for U.S. Appl. No. 11/612,575, filed Dec. 19, 2006.
RCE (dated Jun. 16, 2014) for U.S. Appl. No. 11/612,575, filed Dec. 19, 2006.
Examiner's Answer (dated Dec. 9, 2010) for U.S. Appl. No. 11/612,575, filed Dec. 19, 2006.
Appeal Brief (dated Oct. 28, 2010) for U.S. Appl. No. 11/612,575, filed Dec. 19, 2006.
Notice of Appeal (dated Oct. 15, 2010) for U.S. Appl. No. 11/612,575, filed Dec. 19, 2006.
Office action (dated Aug. 6, 2010) for U.S. Appl. No. 11/612,575, filed Dec. 19, 2006.
Appeal Brief (dated Jan. 14, 2010) for U.S. Appl. No. 11/612,575, filed Dec. 19, 2006.
Notice of Appeal (dated Jan. 12, 2010) for U.S. Appl. No. 11/612,575, filed Dec. 19, 2006.
Final Office Action (dated Nov. 17, 2009) for U.S. Appl. No. 11/612,575, filed Dec. 19, 2006.
Amendment (dated Jul. 1, 2009) for U.S. Appl. No. 11/612,575, filed Dec. 19, 2006.
Office action (dated Apr. 15, 2009) for U.S. Appl. No. 11/612,575, filed Dec. 19, 2006.

* cited by examiner

MANAGING FILE DOWNLOADS

This application is a continuation application claiming priority to Ser. No. 11/612,575, filed Dec. 19, 2006, now U.S. Pat. No. 9,229,933, issued Jan. 5, 2016.

FIELD OF THE INVENTION

The present invention relates generally to computer systems and networks, and more specifically to management of file downloads.

BACKGROUND OF THE INVENTION

It is well known for a client computer or application server to request download of a file from a file server. In one mode of operation, the requester establishes a connection with the file server, identifies a file, specifies a start location for a download, and requests download of the file. In response (assuming the file server will permit the download), the file server begins downloading the file from the specified start location. If the file is lengthy, and the communication bandwidth is limited, the download may take an appreciable time to complete. To alleviate this problem, the requester can establish multiple connections with the file server, and for each connection, identify the file and a different, staggered start location for the respective download and request download from the respective start location. For example, for one connection, the requester can request download of the file beginning at start location 0, for another connection the requester can request download of the same file beginning at start location 5000, for another connection the requester can request download of the same file beginning at start location 10,000. Generally, this will expedite the download, especially if there are parallel communication paths from the file server to the requester. Ideally, when establishing multiple connections for download of the same file in segments in parallel, the requester will specify the segment length of each download request, and the segment length for each connection will extend to the start location of the next download request. If the requester specifies the segment length of the download for a connection, the file server downloads the specified segment beginning at the specified start location. However, if the requester does not specify the length of the download, the file server will begin downloading at the start location and continue downloading until receiving an "end connection" notification from the requester. This will result in wasted (redundant/overlapping) download when the file server does not receive the "end connection" notification until after the file server downloads a portion of the file that overlaps the download from the next connection request. For example, if the first connection request, starting at location 0, results in download of the first 6,000 bytes, this will overlap the next connection request which starts at location 5,000, resulting in wasted/redundant download of 1,000 bytes, i.e. bytes 5,000 to 6,000. In practice, the total amount of overlap during transfer of a file can be much greater.

Accordingly, an object of the present invention is to avoid redundant downloads of parts of a file when the file is being downloaded in parallel pursuant to multiple download requests, and the requester does not specify the length of the download for each request.

SUMMARY OF THE INVENTION

The present invention resides in a system, method and program for managing download of a file. A current request to establish a session is received. In the session, there is a request to download the file beginning at a specified location after a start of the file. The current request does not specify a fixed length of the requested download. A length of the file to be downloaded is estimated based on prior requests to download the file beginning at other respective locations. In response to the current request, the estimated length of the file is downloaded beginning at the specified location. In response to downloading the estimated length of the file beginning at the specified location, the download of the file is suspended for a time window. If the session corresponding to the current request is not terminated within the time window, then download of the file is automatically resumed following the length in further response to the current request. If the session corresponding to the current request is terminated within the time window, then download of the file is not automatically resumed following the length in further response to the current request.

In accordance with a feature of the present invention, the estimation of the length of the file to be downloaded is based on a difference between successive download start locations in respective download requests.

In accordance with another feature of the present invention, the determination of the time window is based at least in part on (a) measurement of an approximate time between receipt of the previous request and termination of the session, or (b) measurement of an approximate time between completion of download of the length of the file beginning at the other location and termination of the session.

DETAILED DESCRIPTION OF THE PREFERRED EMBODIMENTS

Figure 1:
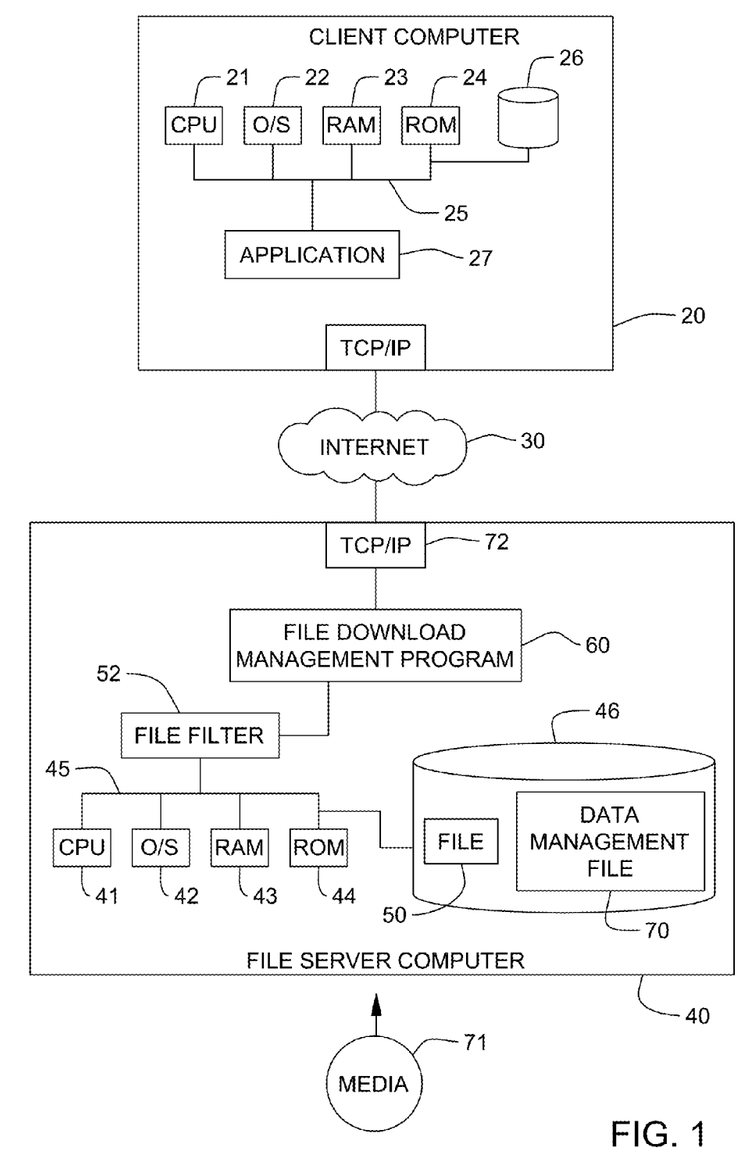
FIG. 1 is a block diagram of a distributed computer system which includes the present invention.

The present invention will now be described in detail with reference to the figures. FIG. 1 illustrates a distributed computer system generally designate 10 which includes the present invention. Distributed computer system 10 includes a "client" computer 20 with a CPU 21, operating system 22, RAM 23 and ROM 24 on a common bus 25, and storage 26, according to the prior art. The "client" computer 20 can be any computer which requests a file from a file server 40 (or other server which directly or indirectly furnishes a file). Client computer 20 also includes an application program 27 which requests a connection via Internet 30 with file server 40, and then requests download of a file 50 from file server 40. The function of application 27 is not important to the present invention, except that it requests download of a file. File server 40 includes a CPU 41, operating system 42, RAM 43 and ROM 44 on a common bus 45, and storage 46 with files including data file 50 and data management file 70, according to the prior art. File server 40 also includes a known file system 52 such as provided by an IBM AIX operating system to implement actual access to file 50. File server 40 also includes a file download management program 60 according to the present invention to manage downloads of file 50 in segments in separate connections to avoid overlapping/redundant downloads. File download management program 60 uses file system 52 to perform the processes required to access storage 46. File download management program 60 is stored on computer readable storage media 46 for execution by CPU 41 via computer readable memory 43.

Application 27 in client computer 20 can be a known application, and requests download of a file such as file 50 in either of two modes of operation. In one mode of operation, application 20 establishes a connection with the file server 40, identifies a file such as file 50 by URL that translates to a file name, and thereby requests download of the file. In response (assuming the file server 40 will permit the download based on authentication and authorization of the requester), the file server begins downloading the file from its beginning (under management of program 60). If the file is lengthy, and the communication bandwidth is limited, the download may take an appreciable time to complete. To alleviate this problem, application 20 can establish multiple connections with the file server, and for each connection identify the file and a different, staggered start location for the download and request download from the respective start location. For example, for one connection, application 20 can request download of the file beginning at location 0, for another connection application 20 can request download of the same file beginning at location 5000, and for another connection application 20 can request download of the same file beginning at location 10,000. Generally, this will expedite the download, especially if there are parallel communication paths from the file server 40 to the requester 20. Ideally, when establishing multiple connections for download of the same file in segments in parallel in different connections, application 20 will specify the segment length of each download request, and the length will reach but not overlap the next download request segment. In the foregoing example, ideally application 27 would specify a segment length of 5,000 bytes for the download request beginning at start location 0, and a segment length of 5,000 bytes for the download request beginning at start location 5,000. However, if application 20 does not specify the length of each download request, then application 20, after receipt of the intended segment (that reaches but does not overlap the next download request segment), may disconnect the connection to file server 40 to terminate the session and its download. (As known in the art, connections are kept open or closed by either the client or the server. When either the client or server wants to stop a transfer it "closes/drops" the connection without notification to other end.)

According to the present invention, server 40 under control of file download management program 60, detects when application 20 has established multiple sessions with server 40 and makes multiple requests for download of the same file from different start locations. If application 20 does not specify the length of each download request in the same file, server 40 computes the difference between adjacent start locations for successive download requests, and initially assumes that each download request is for a segment of that difference in length. In the foregoing example, where application 20 established three connections with server 40 and requested download from start addresses 0, 5,000 and 10,000, program 60 will assume that each download request is for 5,000 bytes, because that is the difference in start locations between the successive download requests. For the download requests that start at start addresses 0 and 5,000, program 60 will initiate download of 5,000 bytes because that is the difference between successive start locations for adjacent download requests, and then pause. As for the download request beginning at start location 10,000, the server 40 will initially download 5,000 byes beginning at start location 10,000 and then pause. If server 40 receives, within a predetermined time window after download of the last of the 5,000 bytes of the download request beginning at location 0, an end connection request from application 27 corresponding to the connection which requested the download starting at location 0, then that is the end of the download for the first download request. This will avoid redundant download of a portion of the file, such as bytes 5,000-6,000, that overlaps that of the next download request beginning at start location 5,000. Likewise, if server 40 receives, within a predetermined time window after download of the last of the 5,000 bytes of the download request beginning at location 5,000, an end connection request from application 27 corresponding to the connection which requested the download starting at location 5,000, then that is the end of the download for the second download request. This will avoid redundant download of a portion of the file, such as bytes 10,000-11,000, that overlaps that of the next download request beginning at start location 10,000. Assume that the file is 17,000 bytes. In such a case, in response to the third connection/download request beginning at start location 15,000, server 40 will download the first 5,000 bytes beginning at location 10,000 and then pause. Because application 27 is expecting the complete file in response to the third download request, application 27 will not disconnect the connection after receipt of byte 15,000. So, after download of the byte 15,000, server 40 will pause as noted above, because server 40 will assume that the download request was for 5,000. However, because application 27 will not disconnect the connection until receipt of the complete file, after the predetermined time window, server 40 will resume download of the file until the end, i.e. byte 17,000. Then, server 40 will disconnect the connection because it has sent the complete file.

Figure 2A:
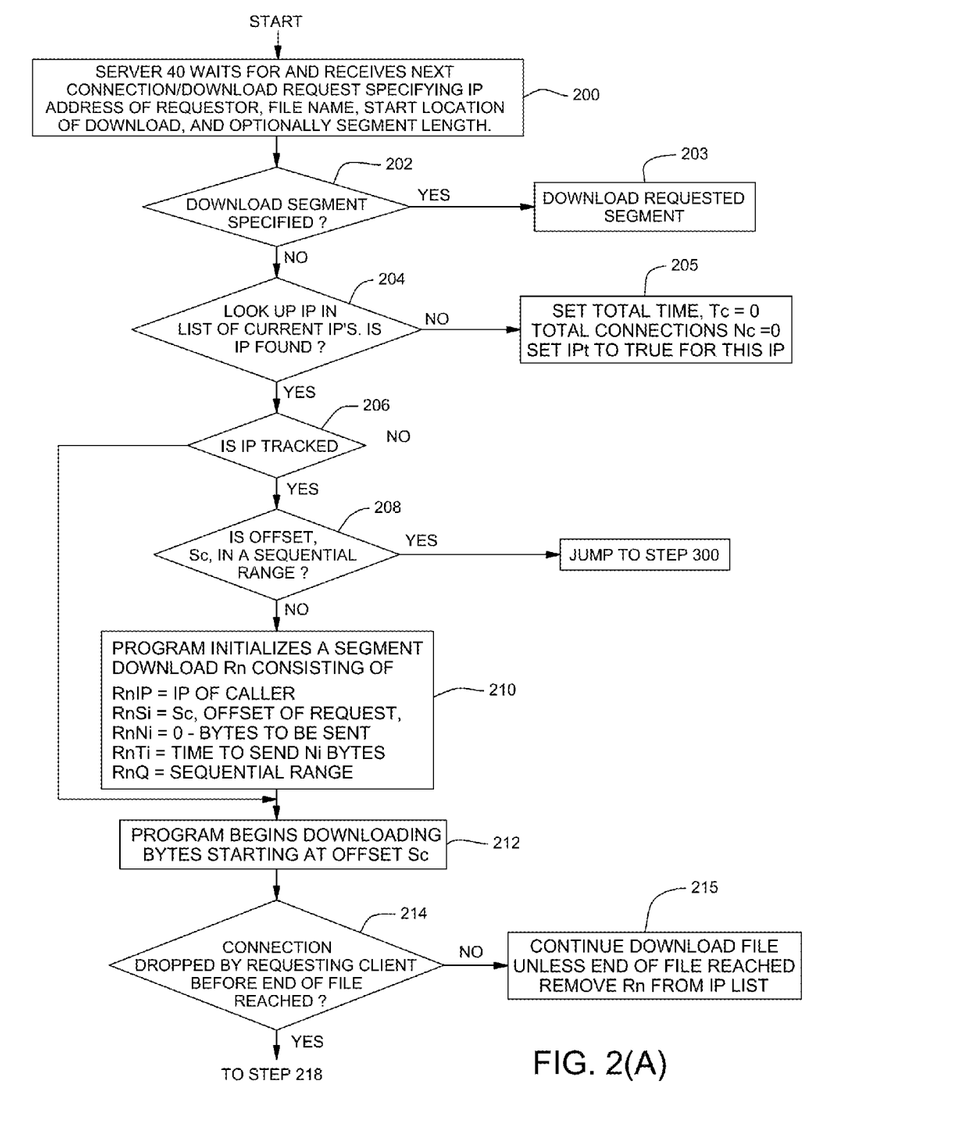
FIGS. 2(A), 2(B) and 2(C) form a flow chart of a file download management program, according to the present invention, within a file server of the distributed computer system of FIG. 1.
Figure 2B:
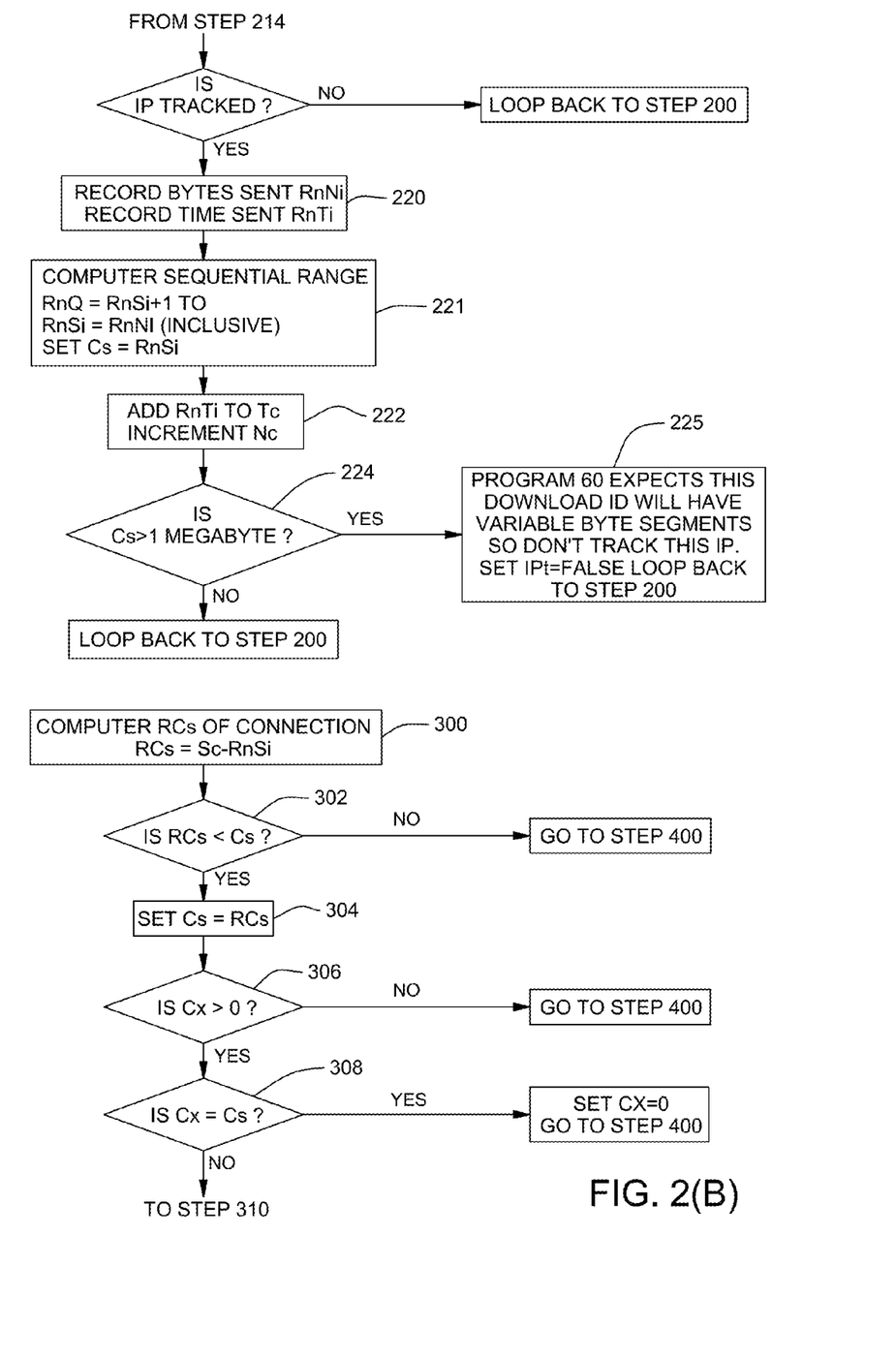
Figure 2C:
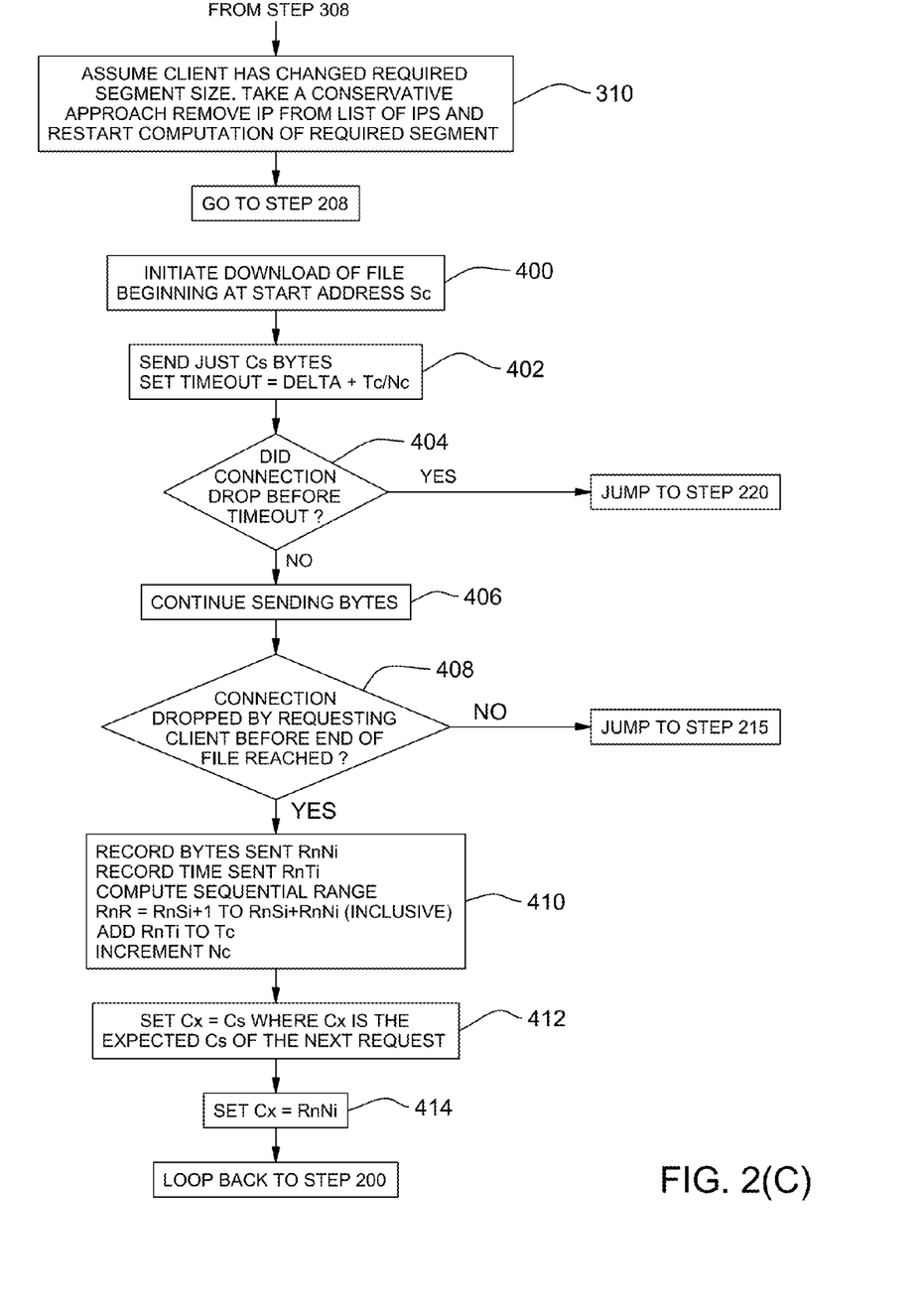

FIGS. 2(A), 2(B) and 2(C) illustrates operation and function of file download management program 60 in more detail. The following definitions of terms and parameters are helpful to understand FIGS. 2(A), 2(B) and 2(C).

"Sequential Request": If a server has seeked to a location, 'L', and sent 'N' bytes then a Sequential Request is a subsequent request for any offset that is inside L+N which includes L+N. For example, if there was a request to seek to location 300000 and the server sent 45000 bytes then a subsequent request to seek to any location of 300001 to and including 345000 is referred to as a 'sequential request'. The range between 300000 and 345001 is defined as the Sequential Range.

Each "non-sequential" Request is stored with the following six items:
    IP—IP address of request
    IPt—TRUE if we are tracking this IP and following this invention IPt.
    (Program 60 detects conditions that should not be tracked and thus treats a request with only an offset as actually wanting all the rest of the bytes of the file and thus not try to estimate or anticipate the requested length.)
    Si—Offset of request
    Ni—Bytes sent for request
    Ti—Time between request and 'dropped' connection.
    Q—Sequential range This collection of items can be designated as Rn. A client computer may open up several non-sequential requests, and program 60 will designate these as R0, R1, R2, etc. A client computer will often open up several connection/download requests on large files where each Rn is a separate download thread and each thread will download a large part of the file by doing a series of small sequential segments. Furthermore Si for Rn can be designated as RnSi. For example, program 60 will store the last Offset Request received for R0 and reference it as R0Si. When program 60 receives a new request with a new offset, program 60 will reference the "new offset" as Sc for Current Segment Offset.

Program 60, as illustrated in FIGS. 2(A-C), determines the client computer's real request size, which is labeled as Cs. Cs is always set to the smallest calculated, prior Cs. For example if Cs has a range of 40000, and the server receives a sequential request of 305000 for a "sequential range" of 300000 to 345001, then program 60 calculates Cs as the lesser of 40000 and 5000 (305000-300000), and sets Cs to 5000.

When the server receives its first request from an IP address (such as client computer 20) for a new file, the server sets Total connect time, Tc=0, and total connections, Nc=0. Note that Tc/Nc is the average time it takes for client computer 20 to (a) receive its expected bytes, (b) drop the connection to program 60, and (c) for program 60 to detect the dropped connection.

In step 200, program 60 receives a request to establish a connection with file server 40 and to download part or all of a file. The request includes in the header the IP address of the requester, and also a download request Ri, the start address Si (where i=0 during the initial connection/download request from this IP address) of the requested download and the name of the file to be downloaded. By way of example, application 27 in client computer 20 made the request, and the IP address indicates client computer 20. The request may or may not specify the segment length of the requested download (decision 202). If so (decision 202, yes branch), then program 60 initiates access and download of the specified segment length of the named file beginning at the specified start location (step 203), and loops back to step 200. The server will not send more bytes than the size of the file.

However, if the download request does not specify a download segment length (decision 202, no branch), then program 60 compares the IP address of the current requester to the IP addresses of previous requesters within an Active List of IP addresses (decision 204). If this is the first download request from this IP address (decision 204, no branch), then program 60 initializes the total connect time, Tc, and total number of connections, Nc (step 205) and then initializes parameters used to evaluate and manage the algorithm step 210. Then program 60 requests the data from storage 46 beginning with the start address, and initiates download of the data to client computer 20 as program 60 accesses/fetches the data from storage (step 212). To access the data from storage 46 in step 212, program 60 makes requests for the data from file system 52, such as that provided by IBM AIX operating system, which handles the low level processes to access and return the data from storage 46. As program 60 (via server 40) downloads the data to client computer 20, program 60 periodically checks if the connection to the client computer 20 is still active (decision 214). As long as program 60 does not detect a lost connection, program 60 will continue to access and download the file (step 215). In some cases, program 60 will download the complete file without detecting a lost connection. In such a case, program 60 will stop the access of storage 46 and stop the download at the end of the named file (step 215). However, in other cases (decision 214, yes branch), program 60 will detect a lost connection before completion of the download of the named file. In such a case, program 60 will check the IP address of the requester to see if it is being tracked (as explained below) (decision 218). If the IP address of the requester is currently being tracked (decision 218, yes branch), program 60 records how many bytes RnNi were sent, and the time, RnTi, from the time of the connection/download request until recognition that the connection has been dropped (step 220). Next, program 60 computes the segment size to send per connection, Cs, and the sequential range, RnQ, based on the bytes that program 60 has sent at this point (step 221). Program 60 then adds RnTi to Tc and increments Nc in data management file 70 (step 222). If Cs exceeds a discovered threshold (for example, one Megabyte) (decision 224), then client computer 20 has a high probability that the segment size will vary from request to request. In such a case, program 60 will set IPt to FALSE and this IP address/requester will no longer be tracked (step 225), and then program 60 will loop back to step 200. If Cs is not greater than the discovered threshold (for example, one Megabyte) (decision 224, no branch), then the IP address will continue to be tracked, and program 60 goes back to step 200 and waits for another connection.

Refer again to step 200, where program 60 waits for and receives the next connection/download request. The request includes in the header the IP address of the requester, and in the body of the request the download segment offset Sc, and the name of the file to be downloaded. By way of example, application 27 also made this next request, and the IP address indicates client computer 20. The request may or may not specify the segment length of the requested download. If the download request specifies the segment length (decision 202, yes branch), then program 60 downloads the specified segment beginning at the specified start location. If the download request does not specify the segment length (decision 202, no branch), then program 60 compares the IP address of the current requester to the IP addresses of previous requesters in the active list (decision 204). If this is not the first connection/download request from this IP address (decision 204, yes branch), then program 60 determines if the IP address is currently being tracked (decision 206). If the IP address is currently being tracked (decision 206 yes branch), then program 60 checks if the segment offset Sc is a sequential offset as defined earlier (decision 208). If it is (decision 208, yes branch), then program 60 jumps to step 300. Program 60 calculates the segment size for this IP address and names the segment size "RCs" for Request Client Segment. This will be the positive difference between the offset of the first request (typically location zero of the file) and the location of the current request start address, e.g., current offset location, Sc, minus previous offset location, RnSi. If the segment actually received and processed by client computer 20 during the first connection RCs is less than the total segment sent for the first connection, Cs, (decision 302, yes branch), the new set of bytes will overlap some of the bytes already sent. This new request is a "sequential request", and program 60 determines if the bytes to send, Cs, should be adjusted based on this new request, as follows. Program 60 assumes that RCs is the segment size that client computer 20 stored during the first transfer, and assumes it to be the segment size the client computer will want for this transfer event (step 304). If this assumption is correct (decision 306, no branch), then server 40 will send RCs bytes (step 400) and for each subsequent connection received from client computer 20 (decision 302 no branch). If this assumption is not correct, at some point the value of Cx will be greater than zero (decision 306, yes branch). Cx is set whenever the server sends more than RCs bytes (see steps 404 through 414 as described later). If Cx is equal to Cs (decision 308 yes branch), the client computer 20 did not disconnect the connection in the expected time (decision 404 no branch), and program 60 sent extra bytes that the client computer did not receive or did not store. In either case, program 60 will continue the download using the original Cs calculation so program 60 sets Cx to 0 and proceeds to download the file (step 400). If Cx is not equal to Cs (decision 308 no branch), then program 60 proceeds to step 310 to recompute the segment size as if the current request is the first request from this client. However, in the current example, decision 306 is "no", i.e. Cx is not greater than "0", and program 60 proceeds to step 400.

In step 400, program 60 begins to download the file from the start address Sc of this connection/download request, even if it overlaps the end portion of the file downloaded during the prior connection/download request RnSi. The reason for repeating the download of the end portion of the file downloaded during the prior connection/download R0 is that the client computer 20 dropped the connection and never received these end portion bytes. Next, program 60 sets a time-out equal to Tc/Nc+Delta, where "Delta" is a predetermined time period or percentage of the average time, Tc/Nc (step 402). Ordinarily, the time-out will be sufficient for program 60 to detect a dropped connection (decision 404, yes branch) after accessing and downloading (from start location Sc) the Cs download segment because the client computer 20 will drop the connection after receiving the bytes it was trying to get. Next, program 60 will jump to step 220 and collect the data for this transfer and setup for another connection. This is the typical and expected path for the majority of connection/download requests.

However, occasionally, the time-out will expire (decision 404, no branch) and in this case, program 60 will resume sending bytes (step 406) until the client computer drops the connection (decision 408, yes branch) or program 60 downloads the end of the file (decision 408, no branch). Assuming the client computer dropped the connection before the end of file was reached, program 60 records the bytes, RnNi, the time, RnTi, computes the sequential range, adds the time to Tc, and increments the number of connections (step 410). Because more than Cs bytes were sent in this connection, program 60 stores the value of Cs in Cx (step 412). Also, program 60 will set Cx=RnNi. In the next connection/download request, program 60 will recalculate Cs in steps 300 through 304. In decision 306, program 60 will realize that the last connection experienced a time-out and sent extra bytes. In decision 308, program 60 will learn if the client computer 20, has shifted its expected segment request (in which case, decision 308, no branch). For example assume Cs was originally computed to be 5000 and many segments were sent through the 'expected path' described above. However at some point decision 404, no branch occurs, and the total bytes sent were 28000 for that connection. In that case, program 60 would set Cx to 5000 (step 41) and Cs to 28000 (step 414). Assume in this example that the client computer 20 has changed the segment size it is expecting to 20000. Consequently, in the next request, program 60 will proceed to decision 302, yes branch and set Cs (step 304). Cx will >0 (decision 306 yes branch) and Cx (5000) is not equal to the new Cs (20000), resulting in decision 308, no branch. When client shifts the segment size, program 60 takes a conservative approach and removes the IP address from the active list of IP addresses, and deletes all Rn's for this IP address. When the next connection/download request arrives, program 60 will treat it as a brand new connection requesting download for the first time.

Program 60 effectively handles a situation where connection/download requests arrive at server 40 out of order, for example, first is a connection/download request at start location X, second is a connection/download request at start location X+D+D, and third is a connection/download request at start location X+D. In such a case the difference in start locations between the start locations of the first and second connection/download requests is D+D, whereas the proper download length should be D. Program 60 handles situations like this in either of two ways. Program 60 maintains a history of start locations in connection/download requests, and can estimate the length for a current download request as equaling the smallest positive difference between the start location of the current connection/download request and the start location of any prior connection/download requests. For example, there are prior connection/download requests with start locations of 0, 300000, 20000, 100000 in chronological order, and a current connection/download request has a start location of 21000. In this example, program 60 will determine the estimated length for the current connection/download request is 1000 bytes based on 21000-20000. However, if the smallest difference is outside the "sequential range" of any prior connection/request, then program 60 treats the current connection/download request as a first request from the client computer, and continues to download the file until the client computer terminates the connection. The following explains the foregoing example in more detail.

In the foregoing example, the first connection/download request started at location 0, and in this example, in response to this first request, server 40 sent 40000 bytes in 10 seconds before client computer 20 terminated the connection. At this point, R0Si=0, R0Ni=40000, R0Ti=10, and R0Q=0 to 400001. Next, program 60 adds R0Ti to Tc and increments the number of connections, Nc=1, to calculate the average TIME-OUT. Because Cs=0, program 60 will use the bytes sent for this first connection as the first estimate for subsequent download requests, i.e. Cs=40000.

In the foregoing example, the second connection/download request started at location 300000, and program 60 determines this is not a sequential request because it is beyond the offset of the data sent in response to the first connection/download request. Consequently, program 60 stores this in R1 Si and sends Cs=40000 bytes and waits Tc/Nc=10 seconds+delta for a dropped connection. In this example, program 60 assumes that 40000 bytes more than fulfills the actual number of bytes the client wanted for this connection. The time to drop the connection should therefore be about the same, for example, 12 sec, R1Si=300000, R1Ni=40000, R1Ti=12, and R1Q=300000-340001. Next, program 60 adds R1Ti to Tc=22 and increments the number of connections, Nc=2.

In this example, the third connection/download request begins at start location 20000 which is inside the R0Q=0 to 40001. Consequently, program 60 sets Cs=20000, sends 20000 bytes and waits for a TIME-OUT=delta+11 seconds (Tc/Nc or 22/2). If client computer 20 terminates the connection before the TIME-OUT expires, that is the end of the download in response to the current connection/download request. Program 60 then assumes that the client computer wants 20000 bytes or less for each subsequent connection: R0Si=20000, R0Ni=20000, R0Ti=12, R0Q=20000-40001, Tc=33 and Nc=3.

In this example, the fourth connection/download request begins at start location 100000 which again is outside the sequential range of R0Q or R1Q, so program 60 stores this start location as R3, and sends just 20000 bytes. Program 60 stores the number of bytes sent and the time, for example 11 seconds, R3Si=100000, R3Ni=20000, R3Ti=11, R3R=100000 to 120001, Tc=44 and Nc=4.

In this example, the fifth connection/download request begins at start location 21000 which is inside R0Q (20000-40001). Next, program 60 calculates Cs as 1000 (21000-20000). In this example, program 60 sends 1000 bytes and client computer 20 ends the connection before the TIME-OUT, for example at 11 seconds again, program determines that it has fulfilled the client computer's requirements. Consequently, program 60 will subsequently use 1000 bytes as the estimated length for all subsequent download/connection requests, R0Si=21000, R0Ni=1000, R0Ti=11, R0Q=21000 to 22001, Tc=55 and Nc=5.

To extent the foregoing example, assume that the sixth connection/download request beings at start location 1000. This start location is not inside any of the sequential ranges for the prior connection/download requests, so program 60 stores the sixth start location as R4, sends 1000 bytes, and waits for TIME-OUT+delta. If client computer 20 terminates the current connection at 11 seconds again, then R4Si=1000, R4Ni=1000, R4Ti=11, R4Q=1000 to 2001, Tc=66 and Nc=6.

To further extend the foregoing example, assume there are 32 connection/download requests with start locations every 1000 bytes from 100000 to 131000, and pursuant to each of these connection/download requests, client computer 20 terminates the connection within the time-out window and server 40 sends 1000 bytes each time. Then, there is another connection/download request with start location 132000, and in response, server 40 sends 33000 more bytes before client computer 20 terminates the connection. Thus, R3Si=132000, R3Ni=34000, R3Ti=0, and R3Q=133000 to 167001. If the next sequential connection/download request has start location of 136000, then program 60 will assume that the segment size has changed. Program 60 will determine that the segment size is now 3000 bytes, i.e. 136000-133000. However, program 60 does not know with sufficient certainty, the time-out for this new segment because there has been such a change in segment length. Consequently, program 60 will continue to send bytes (without a pause) until client computer 20 terminates the connection, as if this was a new IP and its first connection/download request. Then, program 60 will wait for the client computer to terminate the connection, and use the elapsed time as the new Tc with an Nc of 1, but set Cs=3000 and use that for the next sequential segment request.

The IP address of the client computer may change from one connection to another. The IP address used by program 60 is but one technique for identifying the client computer. It is not the only technique available. The present invention covers the use of alternative methods to identify the client computer, such as passing an client identifier on or in the URL itself.

Program 60 can be loaded into server 40 from a computer readable media 71 such as magnetic tape or disk, optical media, DVD, memory stick, semiconductor memory, etc. or downloaded from the Internet via TCP/IP adapter card 72.

Based on the foregoing, a system, method and computer program product for managing downloads have been disclosed. However, numerous modifications and substitutions can be made without deviating from the scope of the present invention. Therefore, the present invention has been disclosed by way of illustration and not limitation, and reference should be made to the following claims to determine the scope of the present invention.

What is claimed:

1. A method for managing download of a file, the method comprising:

in response to a current request received by a server computer from a client computer to establish a session to download the file beginning at a specified location after a start of the file, downloading, by the server computer, an estimated length of a portion of the file beginning at the specified location and computing, by the server computer, a time window for enabling the client computer to avoid a redundant download of a portion of the file by terminating the session within the time window;

in response to said downloading the estimated length and after said computing the time window, automatically suspending, by the server computer for the time window, an additional download of the file pursuant to the current request, wherein said computing the time window comprises computing the time window as equal to Tc/Nc+Delta, wherein Nc is a total number of connections of the previous requests, wherein Tc is a total cumulative connect time of previous requests to download the file beginning at other respective specified locations, wherein the connect time of each previous request is a time interval during which a respective portion of the file was downloaded, in response to each previous request, beginning at the other respective specified location specific to each previous request, wherein Delta is a predetermined time period or a predetermined percentage of Tc/Nc, and wherein Nc is at least 1;

ascertaining, by the server computer, whether or not the session corresponding to the current request has been terminated by the client computer within the time window;

if said ascertaining ascertains that the session corresponding to the current request has not been terminated by the client computer within the time window, then automatically resuming, by the server computer, download of the file pursuant to the current request from where download of the file was suspended, and if said ascertaining ascertains that the session corresponding to the current request has been terminated by the client computer within the time window, then not automatically resuming, by the server computer, download of the file pursuant to the current request from where download of the file was suspended, wherein said not automatically resuming download of the file avoids the redundant download of the portion of the file.

2. The method of claim 1, wherein there is a uniform difference between the other respective specified locations in succession, and the estimated length equals the uniform difference.

3. The method of claim 1, wherein Nc is at least 2.

4. The method of claim 1, wherein said ascertaining ascertains that the session corresponding to the current request has been terminated by the client computer within the time window.

5. The method of claim 1, wherein said estimating comprises estimating the length of the portion of the file to be downloaded based on the previous requests and on the differences.

6. The method of claim 1, wherein the current request does not specify a fixed length of the requested download.

7. The method of claim 6, wherein the previous requests comprise two or more previous requests to download respective portions of the file, wherein the downloaded lengths of the respective portions pertaining to the two or more previous requests comprise at least two different downloaded lengths, wherein the current request is a sequential request within a sequential range of one previous request of the two or more previous requests, and wherein the estimated length of the portion of the file to be downloaded beginning at the specified location of the current request is the smallest of: (i) the difference between the specified location of the current request and the beginning of the sequential range of the one previous request and (ii) the smallest downloaded length of the respective portions pertaining to the two or more previous requests.

8. A computer system, comprising a CPU, a computer readable memory, and a computer readable storage device, said storage device containing program code executable by the CPU via the memory to implement a method for managing download of a file, said method comprising:
   in response to a current request received by a server computer from a client computer to establish a session to download the file beginning at a specified location after a start of the file, downloading, by the server computer, an estimated length of a portion of the file beginning at the specified location and computing, by the server computer, a time window for enabling the client computer to avoid a redundant download of a portion of the file by terminating the session within the time window;
   in response to said downloading the estimated length and after said computing the time window, automatically suspending, by the server computer for the time window, an additional download of the file pursuant to the current request, wherein said computing the time window comprises computing the time window as equal to Tc/Nc+Delta, wherein Nc is a total number of connections of the previous requests, wherein Tc is a total cumulative connect time of previous requests to download the file beginning at other respective specified locations, wherein the connect time of each previous request is a time interval during which a respective portion of the file was downloaded, in response to each previous request, beginning at the other respective specified location specific to each previous request, wherein Delta is a predetermined time period or a predetermined percentage of Tc/Nc, and wherein Nc is at least 1;
   ascertaining, by the server computer, whether or not the session corresponding to the current request has been terminated by the client computer within the time window;
   if said ascertaining ascertains that the session corresponding to the current request has not been to Hated by the client computer within the time window, then automatically resuming, by the server computer, download of the file pursuant to the current request from where download of the file was suspended, and
   if said ascertaining ascertains that the session corresponding to the current request has been terminated by the client computer within the time window, then not automatically resuming, by the server computer, download of the file pursuant to the current request from where download of the file was suspended, wherein said not automatically resuming download of the file avoids the redundant download of the portion of the file.

9. The computer system of claim 8, wherein there is a uniform difference between the other respective specified locations in succession, and the estimated length equals the uniform difference.

10. The computer system of claim 8, wherein Nc is at least 2.

11. The computer system of claim 8, wherein said ascertaining ascertains that the session corresponding to the current request has been terminated by the client computer within the time window.

12. The computer system of claim 8, wherein said estimating comprises estimating the length of the portion of the file to be downloaded based on the previous requests and on the differences.

13. The computer system of claim 8, wherein the current request does not specify a fixed length of the requested download.

14. The computer system of claim 8, wherein the previous requests comprise two or more previous requests to download respective portions of the file, wherein the downloaded lengths of the respective portions pertaining to the two or more previous requests comprise at least two different downloaded lengths, wherein the current request is a sequential request within a sequential range of one previous request of the two or more previous requests, and wherein the estimated length of the portion of the file to be downloaded beginning at the specified location of the current request is the smallest of: (i) the difference between the specified location of the current request and the beginning of the sequential range of the one previous request and (ii) the smallest downloaded length of the respective portions pertaining to the two or more previous requests.

15. A computer program product, comprising a computer readable hardware storage device having computer readable program code stored therein, said program code being executable by a CPU of a computer system to implement a method for managing download of a file, said method comprising:
   in response to a current request received by a server computer from a client computer to establish a session to download the file beginning at a specified location after a start of the file, downloading, by the server computer, an estimated length of a portion of the file beginning at the specified location and computing, by the server computer, a time window for enabling the client computer to avoid a redundant download of a portion of the file by terminating the session within the time window;
   in response to said downloading the estimated length and after said computing the time window, automatically suspending, by the server computer for the time window, an additional download of the file pursuant to the current request, wherein said computing the time window comprises computing the time window as equal to Tc/Nc Delta, wherein Nc is a total number of connections of the previous requests, wherein Tc is a total cumulative connect time of previous requests to download the file beginning at other respective specified locations, wherein the connect time of each previous request is a time interval during which a respective portion of the file was downloaded, in response to each previous request, beginning at the other respective specified location specific to each previous request, wherein Delta is a predetermined time period or a predetermined percentage of Tc/Nc, and wherein Nc is at least 1;

ascertaining, by the server computer, whether or not the session corresponding to the current request has been terminated by the client computer within the time window;

if said ascertaining ascertains that the session corresponding to the current request has not been terminated by the client computer within the time window, then automatically resuming, by the server computer, download of the file pursuant to the current request from where download of the file was suspended, and if said ascertaining ascertains that the session corresponding to the current request has been terminated by the client computer within the time window, then not automatically resuming, by the server computer, download of the file pursuant to the current request from where download of the file was suspended, wherein said not automatically resuming download of the file avoids the redundant download of the portion of the file.

16. The computer program product of claim 15, wherein there is a uniform difference between the other respective specified locations in succession, and the estimated length equals the uniform difference.

17. The computer program product of claim 15, wherein Nc is at least 2.

18. The computer program product of claim 15, wherein said ascertaining ascertains that the session corresponding to the current request has been terminated by the client computer within the time window.

19. The computer program product of claim 15, wherein said estimating comprises estimating the length of the portion of the file to be downloaded based on the previous requests and on the differences.

20. The computer program product of claim 15, wherein the current request does not specify a fixed length of the requested download.

* * * * *